US 8,402,458 B1
Mar. 19, 2013

(12) United States Patent
McCorkendale et al.

(10) Patent No.: US 8,402,458 B1
(45) Date of Patent: Mar. 19, 2013

(54) METHODS AND SYSTEMS FOR CONVERTING NON-LAYERED-SOFTWARE-APPLICATION INSTALLATIONS INTO LAYERED INSTALLATIONS

(75) Inventors: Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 737 days.

(21) Appl. No.: 12/406,324

(22) Filed: Mar. 18, 2009

(51) Int. Cl.
G06F 9/445 (2006.01)
G06F 9/455 (2006.01)

(52) U.S. Cl. ............. 717/175; 717/174; 717/177; 718/1

(58) Field of Classification Search ........................ None
See application file for complete search history.

(56) References Cited

U.S. PATENT DOCUMENTS

| | | | |
|---|---|---|---|
| 5,642,417 A * | 6/1997 | Stringer ........................ | 717/174 |
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,386,698 B2 * | 6/2008 | Gimpl et al. .................. | 717/175 |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,506,338 B2 * | 3/2009 | Alpern et al. ................. | 717/177 |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,610,478 B1 * | 10/2009 | Root .............................. | 717/175 |
| 7,620,956 B2 | 11/2009 | Cook et al. | |
| 7,877,413 B1 | 1/2011 | Cook et al. | |
| 7,886,291 B1 | 2/2011 | Jones et al. | |
| 7,926,053 B1 * | 4/2011 | Rowe et al. .................... | 717/175 |
| 7,945,897 B1 | 5/2011 | Cook | |
| 7,970,789 B1 | 6/2011 | Blaser et al. | |
| 8,010,961 B1 | 8/2011 | Cook et al. | |
| 8,051,111 B2 * | 11/2011 | Noonan, III .................. | 717/175 |
| 8,060,940 B2 | 11/2011 | McCorkendale et al. | |
| 8,108,346 B1 | 1/2012 | Hurren et al. | |
| 8,112,392 B1 | 2/2012 | Bunnell et al. | |
| 8,112,767 B1 | 2/2012 | Cook | |
| 8,136,100 B1 * | 3/2012 | Goldman ....................... | 717/175 |

(Continued)

OTHER PUBLICATIONS

Alain Ribiere, Using virtualization to improve durability and portability of industrial applications, Jul. 13-16, 2008, [Retrieved on Jun. 5, 2012]. Retrieved from the internet: <URL: http://ieeexplore.ieee.org/ielx5/4603797/4618046/04618350.pdf?tp=&arnumber=4618350&isnumber=4618046> 6 Pages. (1545-1550).*

(Continued)

Primary Examiner — Don Wong
Assistant Examiner — Anibal Rivera
(74) Attorney, Agent, or Firm — Advantedge Law Group

(57) ABSTRACT

A method may include receiving a request to convert a non-layered installation of a software application into a layered installation of the software application. The method may also include determining a base location of at least one file associated with the non-layered installation of the software application. The method may further include creating the layered installation of the software application by transitioning the at least one file from the base location to a virtualization layer. Various other methods, systems, and computer-readable-media are also disclosed.

20 Claims, 9 Drawing Sheets

U.S. PATENT DOCUMENTS

| | | | |
|---|---|---|---|
| 8,191,060 B2* | 5/2012 | Malasky et al. | 717/175 |
| 2004/0143830 A1* | 7/2004 | Gupton et al. | 717/174 |
| 2006/0184931 A1* | 8/2006 | Rochette et al. | 717/175 |
| 2007/0006222 A1* | 1/2007 | Maier et al. | 717/174 |
| 2007/0180450 A1 | 8/2007 | Croft et al. | |
| 2008/0010630 A1* | 1/2008 | Ou-Yang et al. | 717/121 |
| 2008/0052707 A1* | 2/2008 | Wassel et al. | 717/174 |
| 2008/0052776 A1* | 2/2008 | Prabhat et al. | 726/15 |
| 2009/0044170 A1* | 2/2009 | Bernardi et al. | 717/174 |
| 2009/0164994 A1* | 6/2009 | Vasilevsky et al. | 718/1 |
| 2009/0265703 A1* | 10/2009 | Bess | 717/174 |
| 2010/0011353 A1* | 1/2010 | Chalupa et al. | 717/177 |
| 2010/0037206 A1* | 2/2010 | Larimore et al. | 717/109 |
| 2010/0077391 A1* | 3/2010 | Domsch et al. | 718/1 |
| 2010/0107163 A1* | 4/2010 | Lee | 717/177 |
| 2010/0138823 A1* | 6/2010 | Thornley | 718/1 |
| 2010/0169948 A1* | 7/2010 | Budko et al. | 726/1 |
| 2011/0010756 A1* | 1/2011 | Choi et al. | 718/1 |
| 2011/0061045 A1 | 3/2011 | Phillips | |
| 2011/0072424 A1* | 3/2011 | Choi et al. | 717/174 |
| 2011/0145806 A1* | 6/2011 | Cook | 717/170 |

OTHER PUBLICATIONS

Ninad Hari Ghodke, A Thesis presented to the graduate school of the university of florida, 2004, [Retrieved on Jun. 5, 2012]. Retrieved from the internet: <URL: http://etd.fcla.edu/UF/UFE0005684/ghodke_n.pdf> 61 Pages (1-52).*

Xiaoxin Chen et al., Overshadow:A Virtualization-Based Approach to Retrofitting Protection in Commodity Operating Systems, ACM 978-1-59593-958-6/03, 2008, [Retrieved on Jun. 5, 2012]. Retrieved from the internet: <URL: http://dl.acm.org/citation.cfm?id=1346284> 12 Pages (2-13).*

Jared Blaser; Process Tracking Application Layered System; U.S. Appl. No. 11/324,571, filed Jan. 3, 2006.

Randall Cook; Dynamic Insertion and Removal of Virtual Software Sub-Layers; U.S. Appl. No. 12/058,782, filed Mar. 31, 2008.

Karl Bunnell et al.; Methods and Systems for Merging Virtualization Sublayers; U.S. Appl. No. 12/396,969, filed on Mar. 3, 2009.

Lance TeNgaio; Distributed Application Virtualization; U.S. Appl. No. 12/142,549, filed on Jun. 19, 2008.

Jeremy Hurren; Feature Based Software Virtualization; U.S. Appl. No. 11/960,706, filed Dec. 20, 2007.

Karl Bunnell et al.; Methods and Systems for Creating and Applying Patches for Virtualized Applications; U.S. Appl. No. 12/369,512, filed Feb. 11, 2009.

Randall Cook; Automatic Virtualization Based on User-Defined Criteria; U.S. Appl. No. 12/024,079, filed on Jan. 31, 2008.

* cited by examiner

METHODS AND SYSTEMS FOR CONVERTING NON-LAYERED-SOFTWARE-APPLICATION INSTALLATIONS INTO LAYERED INSTALLATIONS

Information Technology (IT) administrators may spend a substantial amount of time managing software applications. Managing software applications may include resolving application conflicts, repairing damaged applications, migrating to new versions of applications, installing applications, and patching applications. These tasks may be frustrating and time consuming.

Application virtualization technologies may simplify many IT administration tasks. For example, application virtualization may allow an administrator to turn on or off a user's access to applications and data, which may reduce the time it takes to provide users with the resources they need. Application virtualization may also allow an administrator to reset broken applications to a known-good state without fear of damaging other applications. Application virtualization may insure that each virtualized application has its own copy of DLL files that it would normally share with other applications. This eliminates conflicts that occur when two or more applications may require different versions of the same DLL, thereby rescuing administrators from a condition commonly referred to as "DLL hell."

Application virtualization may allow different versions of the same application to peacefully coexist. Among other things, this means that an administrator may keep older versions intact and available while testing new versions. Even after migrating to a new version, an administrator may quickly roll back to the previous version at any time. Despite these advantages, traditional application virtualization technologies may only allow for virtualization of fresh installations of an application. Thus, an application that has already been installed may not be able to take advantage of software virtualization without being reinstalled.

SUMMARY

Embodiments of the instant disclosure may provide methods and systems for converting a non-layered installation of a software application into a layered installation of the software application. For example, an installation-conversion module may receive a request to convert a non-layered installation of a software application into a layered installation of the software application. The installation-conversion module may determine a base location of one or more files and/or settings associated with the non-layered installation of the software application. The installation-conversion module may then provide the layered installation of the software application by transitioning one or more of the files and/or settings from their base locations to a virtualization layer.

In some embodiments, the installation-conversion module may transition files and settings from base locations to a virtualization layer by moving the files and settings from the base locations to the virtualization layer. In other embodiments, the installation-conversion module may transition the files and settings from the base locations to the virtualization layer by copying the files and settings from the base locations to the virtualization layer and initiating an uninstaller to uninstall the non-layered installation of the software application.

In at least one embodiment, the installation-conversion module may determine the base locations of files and settings by referencing a layered-installation package associated with the non-layered installation. In other embodiments, the installation-conversion module may determine base locations of files and settings by monitoring at least one process associated with the software application. The instant disclosure also includes various other embodiments, alternatives, and examples for transitioning a software application from a non-layered installation to a layered installation.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
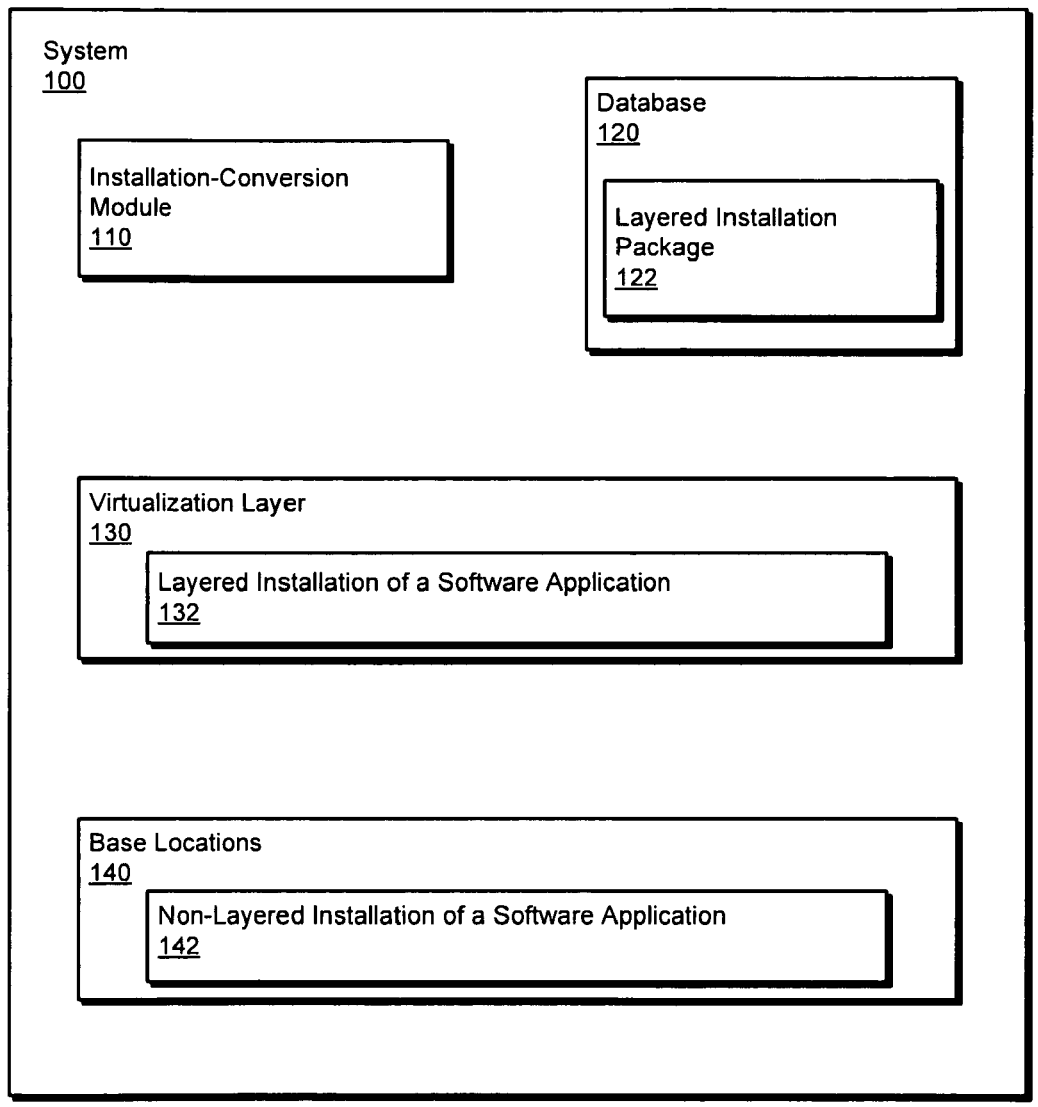
FIG. 1 is a block diagram of an exemplary system for converting a non-layered installation of a software application into a layered installation of the software application according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for converting a non-layered installation of a software application into a layered installation of the software application. For example, an installation-conversion module may receive a request to convert a non-layered installation of a software application into a layered installation of the software application. The installation-conversion module may also determine a base location of at least one file associated with the non-layered installation of the software application and provide the layered installation of the software application by transitioning the at least one file from the base location to a virtualization layer.

Embodiments of the present disclosure may provide various advantages and features that are not provided by traditional technologies. For example, methods and systems described herein may allow for an installed application to take advantage of application layering. Thus, a user may be able to transition settings, files, and/or other information associated with a non-layered installation of an application to a layered installation of the application. These and other embodiments, features, and advantages will be more fully understood upon reading the following detailed description in conjunction with the accompanying drawings and claims.

Figure 2:
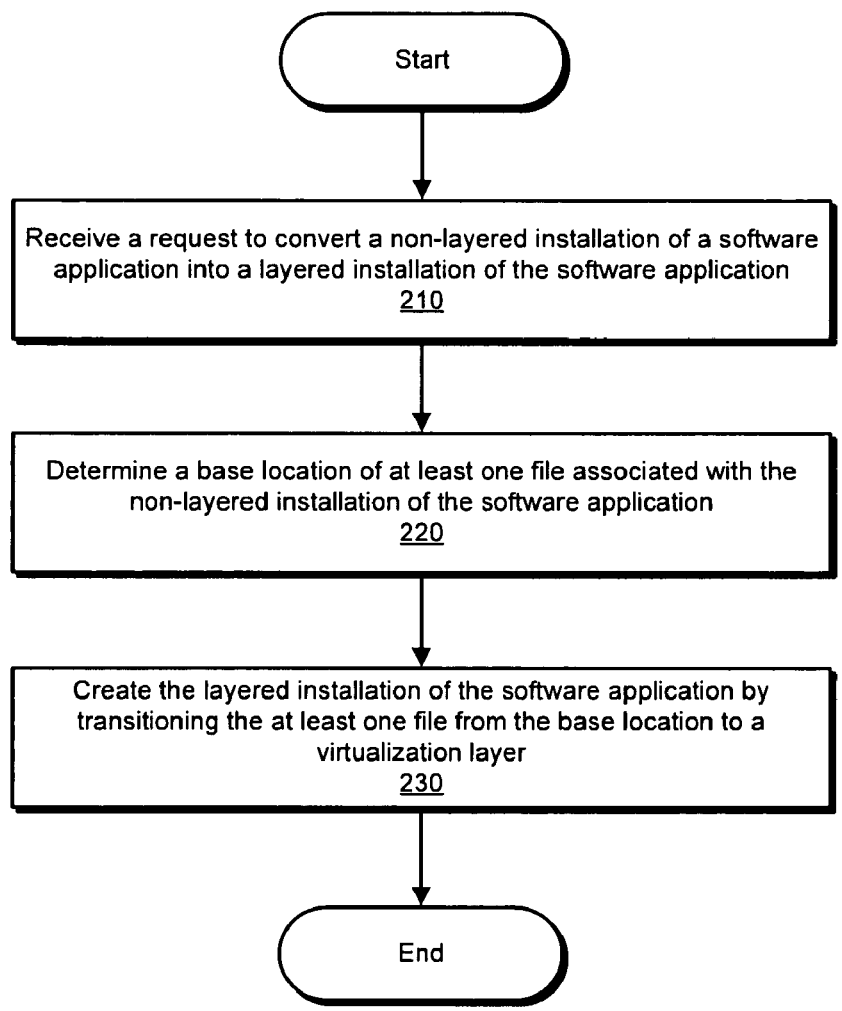
FIG. 2 is a flow diagram of an exemplary method for converting a non-layered installation of a software application into a layered installation of the software application according to certain embodiments.
Figure 3:
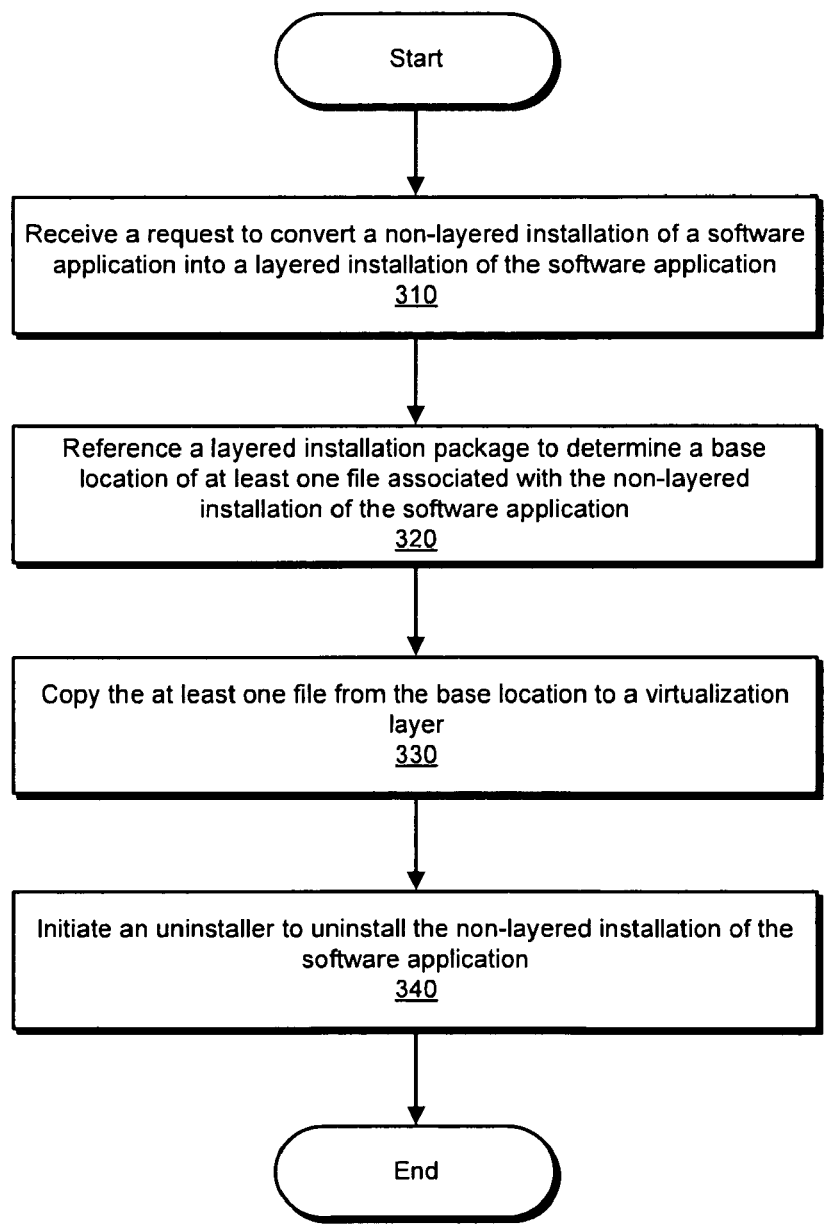
FIG. 3 is another flow diagram of an exemplary method for converting a non-layered installation of a software application into a layered installation of the software application according to certain embodiments.
Figure 8:
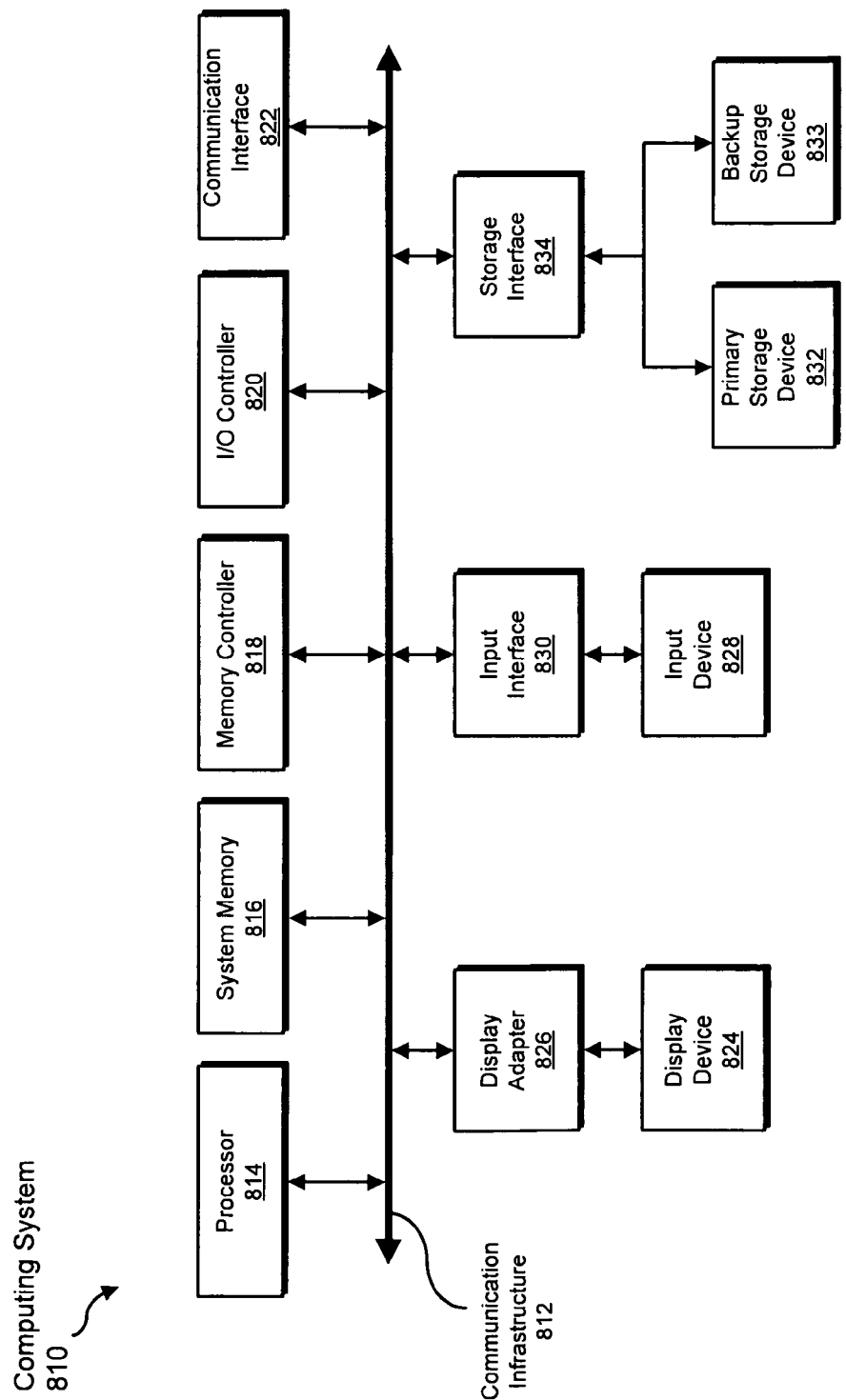
FIG. 8 is a block diagram of an exemplary computing system capable of implementing one or more of the embodiments described and/or illustrated herein.
Figure 9:
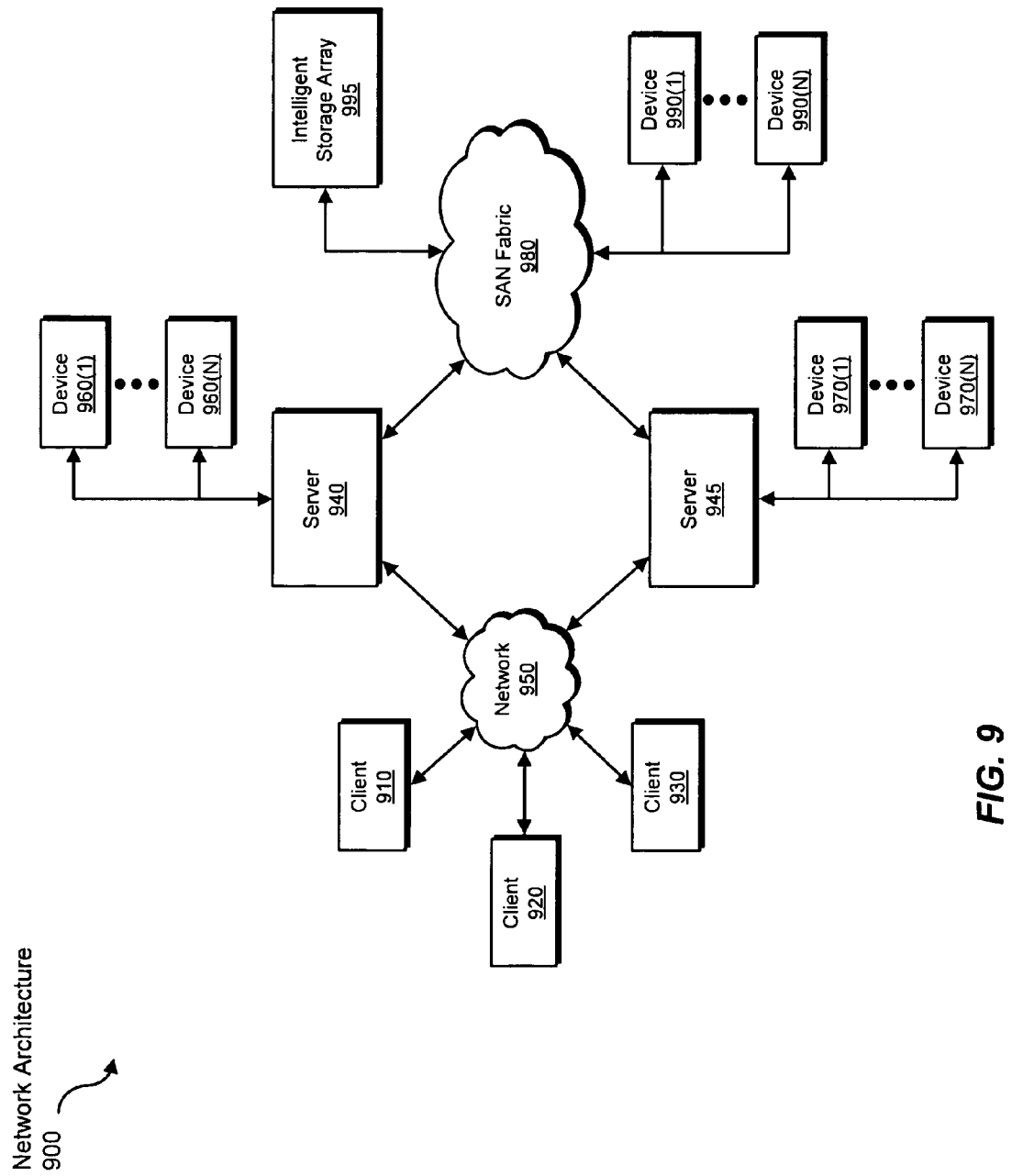
FIG. 9 is a block diagram of an exemplary computing network capable of implementing one or more of the embodiments described and/or illustrated herein.

FIG. 1 shows an exemplary system for converting a non-layered installation of a software application into a layered installation of the software application, and FIGS. 2 and 3 show methods for accomplishing the same. FIGS. 4-7 show exemplary application layering technologies, and FIGS. 8-9 illustrate an exemplary computing system and network architecture for implementing embodiments of the instant disclosure.

FIG. 1 illustrates an exemplary layering computing system 100 for converting a non-layered installation of a software application into a layered installation of the software application. Layering computing system 100 may include an installation-conversion module 110, a database 120, a virtualization layer 130, and base locations 140. Virtualization layer 130 and/or base locations 140 may be stored in one or more storage devices of layering computing system 100.

Installation-conversion module 110 may represent one or more software applications or programs that, when executed by a computing system, may cause the computing system to perform one or more of the steps disclosed herein, such as receiving a request to convert a non-layered installation of a software application into a layered installation of the software application, determining a base location of at least one file associated with the non-layered installation of the software application, and/or providing the layered installation of the software application by transitioning the at least one file from the base location to a virtualization layer.

As will be described in greater detail below, installation-conversion module 110 may represent a software module configured to run on one or more computing devices, such as computing system 810 in FIG. 8 and/or portions of exemplary network architecture 900 in FIG. 9. Installation-conversion module 110 may also represent all or portions of one or more special-purpose computers configured to perform one or more of the tasks associated with steps disclosed herein.

As previously noted, layering computing system 100 may include database 120. Database 120 may represent a portion of one or more computing devices. For example, database 120 may represent a portion of computing system 810 in FIG. 8 and/or potions of exemplary network architecture 900 in FIG. 9. Database 120 may be implemented using any suitable data structure or data storage mechanism. Database 120 may include a layered-installation package 122.

Layered-installation package 122 may include information that indicates where to look for and/or how to identify an application's executables, settings, and/or other files. For example, a layered-installation package may be a layered MICROSOFT INSTALLER (MSI) package. As described in the discussion of FIG. 2, such packages may be useful in converting an existing installation of a software application into a layered installation of the software application.

Layering computing system_100 also includes virtualization layer 130. As used herein, the phrase "virtualization layer" generally refers to any virtualization technology capable of providing a layered (i.e., virtualized) installation of an application. For example, a virtualization layer may provide a layer of abstraction between an operating system and a software application by redirecting system calls for the software application's files, processes, and settings. FIGS. 4-7 provide various examples and explanations of virtualization layers.

Virtualization layer 130 may include a layered installation of a software application 132. As used herein the phrase "layered installation of a software application" generally refers to any software application with one or more settings, executable files, data files, and/or other files stored on a virtualization layer. For example, a layered installation of a software application may include a set of files and registry settings encapsulated in a virtualization layer. From the perspective of users and/or an underlying operating system, a layered installation of a software application may be indistinguishable from a conventionally installed application.

In addition to virtualization layer 130, system 100 includes base locations 140. As used herein, the phrase "base location" may refer to a location of a file or setting in a non-layered installation of a software application. In some embodiments, a base location may be a location where a software application installs or stores a file when the software application is not virtualized.

As shown in FIG. 1, base locations 140 may include a non-layered installation of a software application 142. A non-layered installation of a software application may include any installation of a software application that is not installed on a virtualization layer. For example, a non-layered installation of a software application may be an installation of a software application where the software application's settings, executable files, data files, and other files are installed in base locations on a computing system.

FIG. 2 illustrates a method for converting a non-layered installation of a software application into a layered installation of the software application. The steps shown in FIG. 2 may be performed by any hardware, computing instructions (e.g., software), or combination thereof. In some embodiments, one or more of the steps shown in FIG. 2 may be performed by installation-conversion module 110. For example, at step 210 installation-conversation module 110 may receive a request to convert a non-layered installation of a software application into a layered installation of the software application. Receiving the request may initiate the process of converting a non-layered installation of the software application into a layered installation of the software application. In some embodiments, a user may send the request. In other embodiments, a computing device or application may send the request.

At step 220, installation-conversion module 110 may determine a base location of at least one file associated with the non-layered installation of the software application. Installation-conversion module 110 may determine the base location of the file using any suitable base-location-determination mechanism. For example, installation-conversion module 110 may reference a layered-installation package associated with the non-layered installation to determine the base location of the file. A layered-installation package may be associated with a non-layered installation if the layered-installation package is for installing the software application of the non-layered installation. Installation-conversion module 110 may use the layered-installation package to determine the base location by using information in the layered-installation package to determine where the software application typically installs the file.

In other embodiments, installation-conversion module 110 may monitor at least one process associated with the software application to determine the base location of the file. For example, while the software application is running from its non-layered installation, installation-conversion module 110 may monitor a process of the software application. Installation-conversion module 110 may determine the base location of the file by monitoring where the software application accesses the file. In some embodiments, installation-conversion module 110 may monitor one or more processes of the software application during one or more user sessions to determine base locations of files associated with the software application.

In other embodiments, installation-conversion module 110 may receive input from a user to determine the base location of the file. For example, installation-conversion module 110 may ask a user where one or more files associated with the software application are located. In some embodiments, installation-conversion module 110 may query a user about which files and settings of an application should be moved into a virtualization layer.

At step 230, installation-conversion module 110 may create the layered installation of the software application by transitioning the file from the base location to a virtualization layer. By transitioning the file from the base location to the virtualization layer, installation-conversion module 110 may transform a non-layered-software-application installation into a layer installation. Installation-conversion module 110 may use one or more transitioning mechanisms to transition the file from the base location to the virtualization layer. In some embodiments, installation-conversion module 110 may transition the file from the base location to the virtualization layer by moving the file from the base location to the virtualization layer. For example, the file may be ripped from the base location and saved to the virtualization layer. In such embodiments, if the file is a shared file, installation-conversion module 110 may need to adjust a usage count of the file.

In other embodiments, installation-conversion module 110 may transition the file from the base location to a virtualization layer by copying the file from the base location to the virtualization layer and initiating an uninstaller to uninstall the non-layered installation of the software application. In such embodiments, a traditional application uninstaller may be used to uninstall the non-layered installation of the software application, thereby removing the file from the base location.

As used herein, the term "file" may refer to an executable file, a data file, setting information (e.g., a registry key), and/or any other type of file. In some embodiments, one or more executable files, data files, settings, and/or other files associated with the software application may be transitioned from base locations to the virtualization layer. Installation-conversion module 110 may transition any type of executable file, data file, setting, or other file from a base location to a virtual layer. Executable files may include any files that contain instructions of a software application. Data files may include any files that contain data created, manipulated, or otherwise accessed by the software application. Settings may include registry keys and/or information that indicate one or more settings of the software application.

FIG. 3 illustrates another exemplary method for transitioning a non-layered installation of a software application to a layered installation of the software application. The steps shown in FIG. 3 may be performed by any hardware, computing instructions (e.g., software), or combination thereof. In some embodiments, one or more of the steps shown in FIG. 3 may be performed by installation-conversion module 110.

For example, at step 310 installation-conversion module 110 may receive a request to convert a non-layered installation of a software application into a layered installation of a software application.

At step 320, installation-conversion module 110 may reference a layered-installation package to determine a base location of at least one file associated with the non-layered installation of the software application. At step 330, installation-conversion module 110 may copy the at least one file from the base location to a virtualization layer. Then, at step 340 installation-conversion module 110 may initiate an uninstaller to uninstall the non-layered installation of the software application. The uninstaller may be an uninstaller associated with the non-layered installation of the software application.

Figure 4:
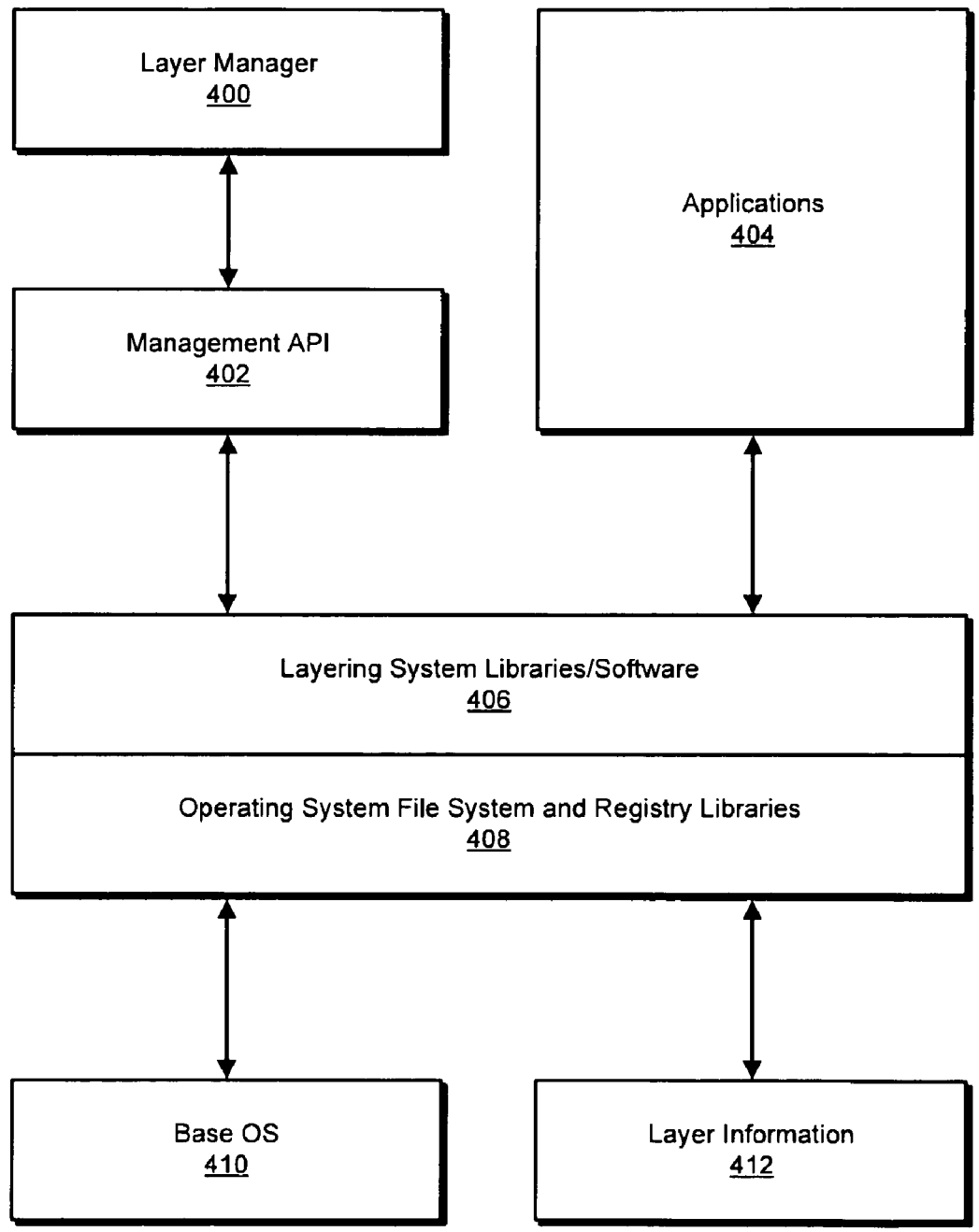
FIG. 4 is a block diagram of exemplary components of a layering computing system at a conceptual level according to certain embodiments.

FIG. 4 shows components of a computing system with a virtualization layer at a conceptual level. A base operating system 410 may form a platform with which applications may be executed and from which files may be accessed in file systems. Base operating system 410 may include registry settings, which may be globally available to applications for reading and writing. The computing system may include libraries 408 for executing the functions of the operating system. Libraries 408 may include operating system files and registry entries. Layering system libraries and software 406 may be tied to libraries 408. Layering system libraries and software 406 may interpret file system and registry accesses from applications 404. The layering system software 406 may perform computations to determine whether the access should be permitted to continue to the base operating system 410 or should be redirected to layer information 412. Layer information 412 may be information relating to the contents of files and registry settings. Layer manager application 400 may control configuration of layering system software 406 through a management Application Programming Interface (API) 402.

Figure 5:
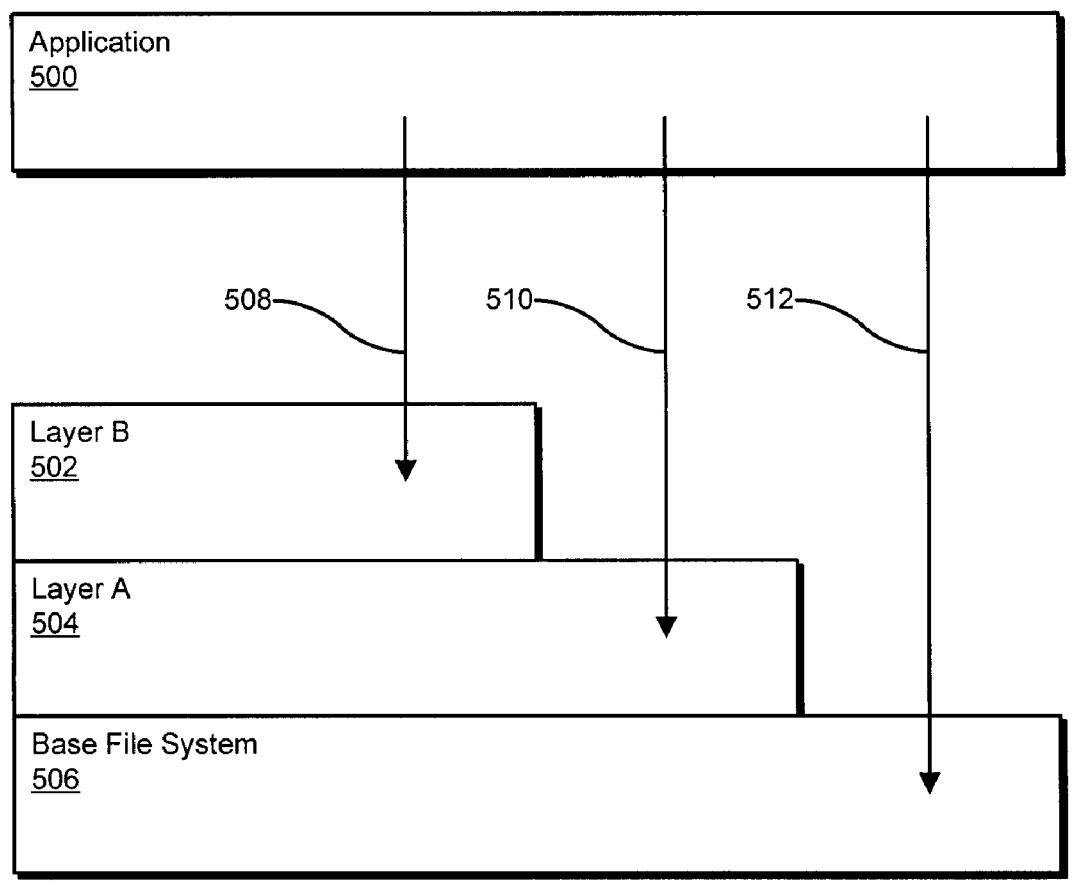
FIG. 5 is a block diagram of an exemplary operation of a layering computing system at a conceptual level according to certain embodiments.

FIG. 5 shows the operation of a computing system with a virtualization layer at a conceptual level. FIG. 5 illustrates an application 500, which may be a software application that has been converted from a non-layered installation to a layered installation. One or more files associated with application 500 may be located on virtualization layer B 502 and/or virtualization layer A 504. Layer B may have priority over layer A, which in turn may have priority over a base file system. Application 500 may operate as follows. A first file access 508 may be made by application 500. The virtualization system may first search in layer B 502 for the requested file. Layer B 502 may include an entry for file access 508, and the corresponding file in layer B 502 may be returned to the application. Since layer B 502 has priority over layer A 504 and base file system 506, even if layer A 504 and base file system 506 have entries that correspond to file access 508, the virtualization system will return the entry from layer B 502.

Application 500 may make another file access 510. The virtualization system may not find a corresponding entry in layer B 502, but may find an entry in layer A 504. A third file access request 512 may not have a corresponding entry in layer B 502 or layer A 504, and the virtualization system may therefore return an entry from base file system 506.

Figure 6:
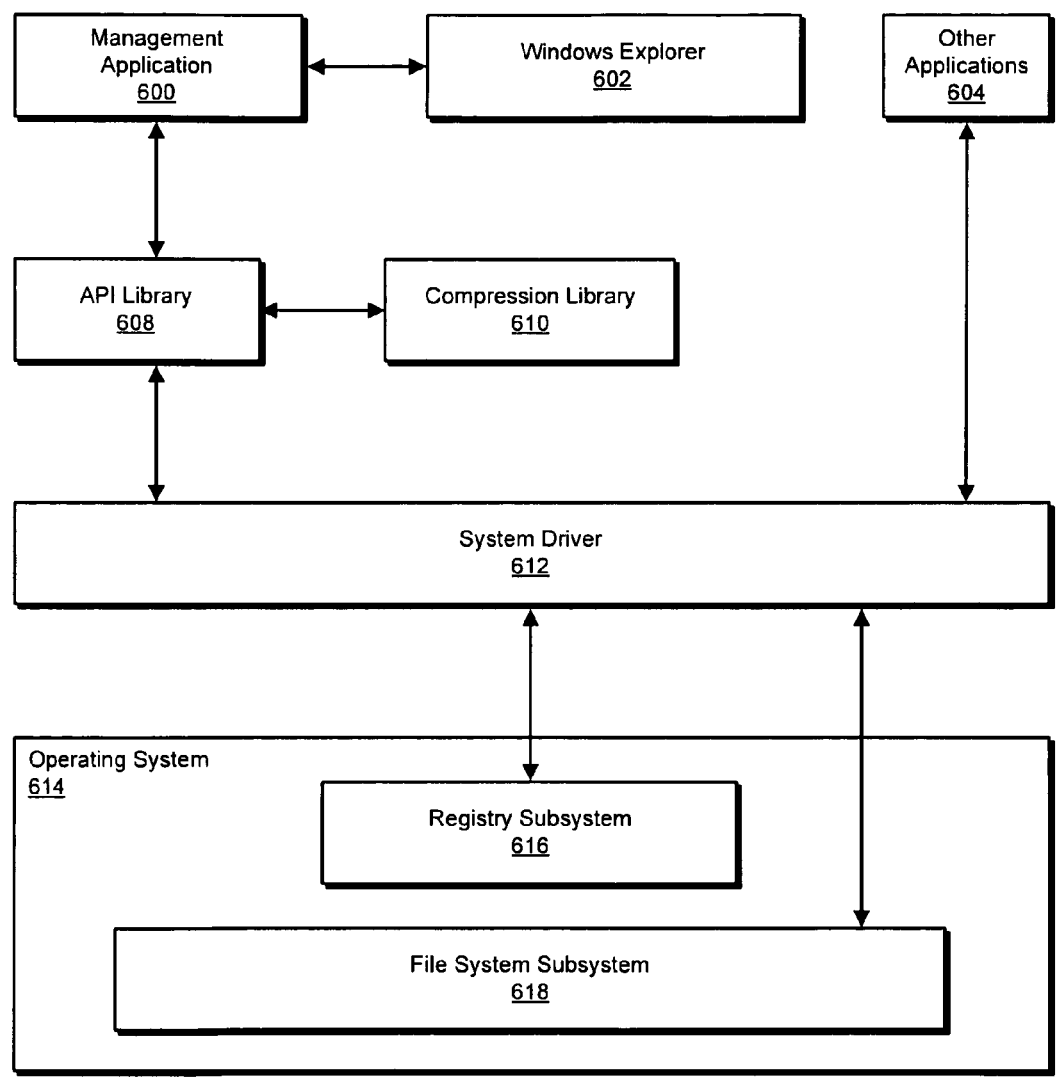
FIG. 6 is a block diagram of a layering computing system according to certain embodiments.

FIG. 6 shows an example of a computing system with a virtualization layer installed. The computing system may include an operating system 614. Operating system 614 may include a registry subsystem 616 and a file system subsystem 618. A system driver 612 may be installed on operating system 614 and may have first processing priority for registry and file system accesses. A management application 600 may provide an administrator with an interface to interact with system driver 612 and make changes to layers. An API library 608 may provide a convenient interface for management application 600 to interface with system driver 612.

Management application 600 may provide notices to a Windows Explorer 602 indicating that the contents of a mounted file system have been changed. Other applications 604 may interact with the system, performing read and write operations to the file system and registry through system driver 612. A compression library 610 may be provided to compress layer information.

Figure 7:
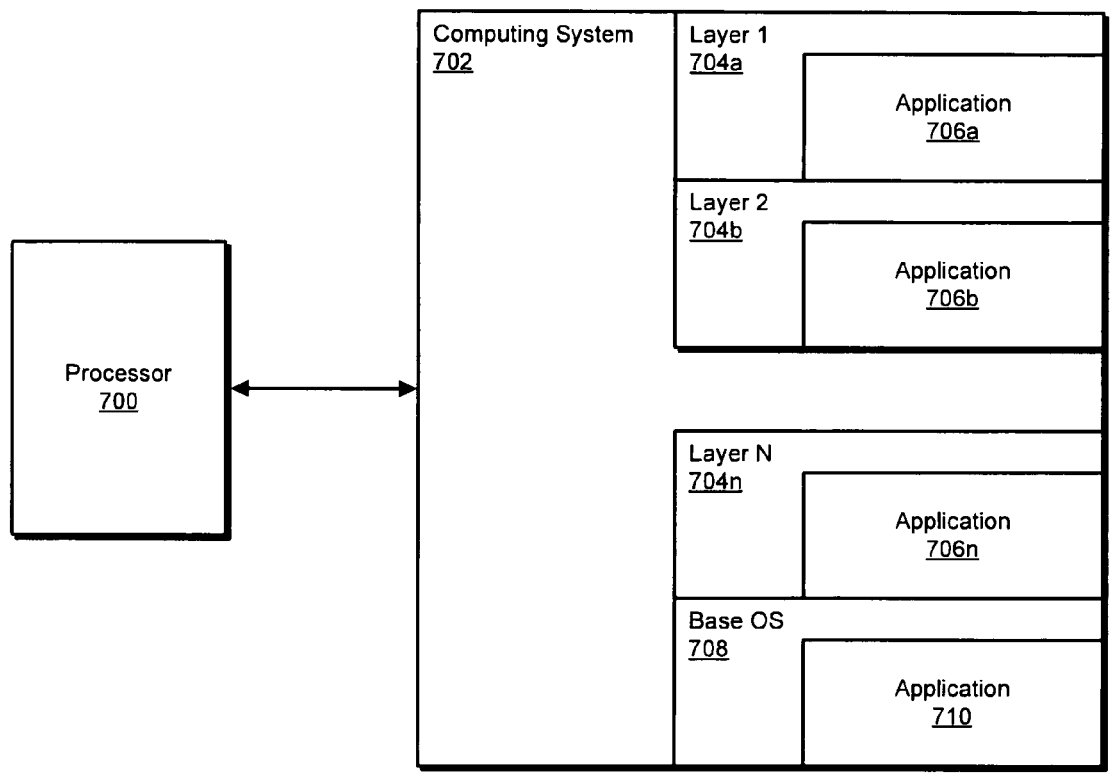
FIG. 7 is a block diagram of an exemplary layering computing system at an organizational level according to certain embodiments.

FIG. 7 illustrates an example of a computing system 702 that includes applications 706a-n converted from non-layered installations to layered installations. Computing system 702 may contain a number of layers 704a-n. Applications 706a-n may be installed on layers 704a-n, respectively. As referred to herein, a layer (or virtualization layer) may refer to a set of file system and registry changes that may be managed by layered system software. In some embodiments, a layer may contain changes to one or more file systems but may not contain registry changes.

A layer may isolate an application from a base file system and may include files and a directory structure of the application's installation. The application files and directories may be shadowed or overlaid over the regular operating file system. Shared libraries (such as DLLs), system accessible configuration (such as registry entries), and version control may be managed by a layering subsystem.

Though each layer may be a separate and individual entity within a computing system, the application files, data, and system-accessible configuration may be presented as though they resided in their respective ordinary locations. Thus, an application stored in a layer may appear to the operating system of a computing system as if it had been installed using traditional installation techniques.

Converting non-layered installations of software application to layered installations of software applications may have numerous advantages. For example, if the applications are stored individually in layers, interactions between application files may no longer occur due to conflicting shared libraries (DLLs), as each application may use its virtual libraries before accessing the base operating system. In some embodiments, applications transitioned to a layer in a computing system may be safely and completely uninstalled or removed from the computing system by removing the layer from the image. Isolating application files and configuration data in a layer may provide several benefits, including the ability to delete, disable, and enable applications in a simple way. Converting non-layered installations of applications into layered installations of applications may result in enhanced stability, reliability, usability, and security of a computing system.

A software application installed in a virtualization layer may be an application in any commonly used meaning, including word processors, browsers, system tools, games, and the like, and the principles described herein may also extend to any other software installed to a computing system.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the receiving, determining, creating, copying, and/or initiating steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as receiving, determining, creating, copying, and/or initiating.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the receiving, determining, creating, copying, and/or initiating steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel Examples of host adapters include, without limitation, SCSI host adapters, USB host adapters, IEEE 894 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the receiving, determining, creating, copying, and/or initiating steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the receiving, determining, creating, copying, and/or initiating steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (i.e., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the receiving, determining, creating, copying, and/or initiating steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (i.e., hard disk drives and floppy disks), optical-storage media (i.e., CD- or DVD-ROMs), electronic-storage media (i.e., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternately, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the receiving, determining, creating, copying, and/or initiating steps disclosed herein. Network architecture 900 may also be used to perform and/or be a means for performing other steps and features set forth in the instant disclosure.

As detailed above, computing system 810 and/or one or more of components of network architecture 900 may perform and/or be a means a performing, either alone or in combination with other elements, one or more steps of the exemplary methods described and/or illustrated herein. For example, a computing system (e.g., computing system 810 and/or one or more of the components of network architecture 900) may perform a computer-implemented method for converting a non-layered installation of a software application into a layered installation of the software application. The computing system may receive a request to convert a non-layered installation of a software application into a layered installation of the software application, determine a base location of at least one file associated with the non-layered installation of the software application, and create the layered installation of the software application by transitioning the at least one file from the base location to a virtualization layer.

In some embodiments, the computing system may transition the at least one file from the base location to a virtualization layer by moving the at least one file from the base location to the virtualization layer. In other embodiments, the computing system may transition the at least one file from the base location to the virtualization layer by copying the at least one file from the base location to the virtualization layer and initiating an uninstaller to uninstall the non-layered installation of the software application.

According to certain embodiments, the computing system may determine the base location of the at least one file by referencing a layered-installation package associated with the non-layered installation. In various embodiments, the computing system may determine the base location of the at least one file by monitoring at least one process associated with the software application. In some embodiments, the computing system may determine the base location of the at least one file by receiving input from a user.

In various embodiments, the layered installation of the software application may cause requests from the software application to access the at least one file to be redirected to the virtualization layer. In some embodiments, the at least one file may include an executable of the application, a registry key of the application, and/or a data file associated with the application.

According to certain embodiments, the computing system may determine a base location of at least one file associated with the non-layered installation of the software application by determining base locations of executable files, data files, and settings associated with the software application. The computing system may provide the layered installation of the software application by transitioning the executable files, data files, and settings from the base locations to the virtualization layer.

In some embodiments, a system may include a database configured to store a layered-installation package of a software application. The system may also include an installation-conversion module in communication with the database and programmed to: receive a request to convert a non-layered installation of a software application into a layered installation of the software application, reference the layered-installation package to determine a base location of at least one file associated with the non-layered installation of the software application, and provide the layered installation of the software application by transitioning the at least one file from the base location to a virtualization layer.

According to various embodiments, transitioning the at least one file from the base location to the virtualization layer may include moving the at least one file from the base location to the virtualization layer. In some embodiments, transitioning the at least one file from the base location to a virtualization layer may include copying the at least one file from the base location to the virtualization layer and initiating an uninstaller to uninstall the non-layered installation of the software application. In at least one embodiment, the installation conversion module may be further programmed to: determine base locations of at least one executable file, at least one data file, and at least one setting associated with the software application, and transition the at least one executable file, at least one data file, and at least one setting from the base locations to the virtualization layer.

According to certain embodiments, a computer-readable medium may include one or more computer-executable instructions that, when executed by a computing device, may cause the computing device to receive a request to convert a non-layered installation of a software application into a layered installation of the software application, determine a base location of at least one file associated with the non-layered installation of the software application, and create the layered installation of the software application by transitioning the at least one file from the base location to a virtualization layer.

In some embodiments, transitioning the at least one file from the base location to a virtualization layer may include copying the at least one file from the base location to the virtualization layer and initiating an uninstaller to uninstall the non-layered installation of the software application. In various embodiments, the one or more computer-executable instructions that determine the base location of the at least one file may be configured to reference a layered-installation package associated with the non-layered installation. In certain embodiments, the one or more computer-executable instructions may be further configured to cause the computing device to: determine base locations of executable files, data files, and settings associated with the software application and transition the executable files, data files, and settings from the base locations to the virtualization layer.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method comprising:
receiving a request to convert a non-layered installation of a software application into a layered installation of the software application, the non-layered installation of the software application being installed to a base file system of a computing system;
determining a base location of at least one file associated with the non-layered installation of the software application, the base file system comprising the base location;
creating the layered installation of the software application by transitioning the at least one file from the base location to a virtualization layer, wherein:
the virtualization layer is isolated from the base file system,
the virtualization layer overlays the base location,
the virtualization layer has priority over the base file system;
redirecting access requests for the at least one file from the base file system to the virtualization layer such that the at least one file in the virtualization layer appears as though it were located in the base file system;
the receiving, determining, and creating, and redirecting are performed by a layering computing system.

2. The computer-implemented method of claim 1, wherein transitioning the at least one file from the base location to the virtualization layer comprises moving the at least one file from the base location to the virtualization layer.

3. The computer-implemented method of claim 1, wherein transitioning the at least one file from the base location to the virtualization layer comprises:
copying the at least one file from the base location to the virtualization layer;
initiating an uninstaller to uninstall the non-layered installation of the software application.

4. The computer-implemented method of claim 1, wherein determining the base location of the at least one file comprises referencing a layered-installation package associated with the non-layered installation.

5. The computer-implemented method of claim 1, wherein determining the base location of the at least one file comprises:
monitoring at least one process associated with the software application;
identifying, during the monitoring, a location where the software application accesses the at least one file.

6. The computer-implemented method of claim 1, wherein determining the base location of the at least one file comprises receiving input from a user indicating that the software application is installed to the at least one base location.

7. The computer-implemented method of claim 1, wherein the layering computing system is programmed to enable and disable the software application by enabling and disabling the virtualization layer.

8. The computer-implemented method of claim 1, wherein the at least one file comprises an executable of the software application.

9. The computer-implemented method of claim 1, wherein the at least one file comprises a registry key of the software application.

10. The computer-implemented method of claim 1, wherein the at least one file comprises a data file associated with the software application.

11. The computer-implemented method of claim 1, wherein:
determining the base location of the at least one file associated with the non-layered installation of the software application comprises determining base locations of executable files, data files, and settings associated with the software application, the executable files, data files, and settings being installed to the base file system and a base registry of a base operating system on the computing system;
creating the layered installation of the software application by transitioning the at least one file from the base location to the virtualization layer comprises transitioning the executable files, data files, and settings from the base locations to the virtualization layer.

12. A system comprising:
a database configured to store a layered-installation package of a software application;
an installation-conversion module in communication with the database and programmed to:
receive a request to convert a non-layered installation of the software application into a layered installation of the software application, the non-layered installation of the software application being already installed to a base file system of a computing system;
reference the layered-installation package to determine a base location of at least one file associated with the non-layered installation of the software application, the base file system comprising the base location;
create the layered installation of the software application by transitioning the at least one file from the base location to a virtualization layer, wherein:
the virtualization layer is isolated from the base file system,
the virtualization layer overlays the base location,
the virtualization layer has priority over the base file system;
redirect access requests for the at least one file from the base file system to the virtualization layer such that the at least one file in the virtualization layer appears as though it were located in the base file system;
one or more processors configured to execute the installation-conversion module.

13. The system of claim 12, wherein transitioning the at least one file from the base location to the virtualization layer comprises moving the at least one file from the base location to the virtualization layer.

14. The system of claim 12, wherein transitioning the at least one file from the base location to the virtualization layer comprises:
copying the at least one file from the base location to the virtualization layer;
initiating an uninstaller to uninstall the non-layered installation of the software application.

15. The system of claim 12, wherein the installation-conversion module is further programmed to:
determine base locations of at least one executable file, at least one data file, and at least one setting associated with the software application;
transition the at least one executable file, at least one data file, and at least one setting from the base locations to the virtualization layer.

16. A computer-readable-storage medium comprising one or more computer-executable instructions that, when executed by a computing device, cause the computing device to:
receive a request to convert a non-layered installation of a software application into a layered installation of the software application, the non-layered installation of the software application being installed to a base file system of a computing system;
determine a base location of at least one file associated with the non-layered installation of the software application, the base file system comprising the base location;
create the layered installation of the software application by transitioning the at least one file from the base location to a virtualization layer, wherein:
the virtualization layer is isolated from the base file system,
the virtualization layer overlays the base location,
the virtualization layer has priority over the base file system;
redirect access requests for the at least one file from the base file system to the virtualization layer such that the at least one file in the virtualization layer appears as though it were located in the base file system.

17. The computer-readable-storage medium of claim 16, wherein transitioning the at least one file from the base location to the virtualization layer comprises:
copying the at least one file from the base location to the virtualization layer;
in response to transitioning the at least one file from the base location to the virtualization layer, initiating an uninstaller to uninstall the non-layered installation of the software application.

18. The computer-readable-storage medium of claim 16, wherein the one or more computer-executable instructions that determine the base location of the at least one file are configured to reference a layered-installation package associated with the non-layered installation.

19. The computer-readable-storage medium of claim 16, wherein the one or more computer-executable instructions that determine the base location of the at least one file are configured to monitor at least one process associated with the software application.

20. The computer-readable-storage medium of claim 16, wherein the one or more computer-executable instructions are further configured to cause the computing device to:
determine base locations of executable files, data files, and settings associated with the software application;
transition the executable files, data files, and settings from the base locations to the virtualization layer.

* * * * *